United States Patent [19]

Ankenbauer et al.

[11] Patent Number: 4,952,078
[45] Date of Patent: Aug. 28, 1990

[54] DIE CAST ANTI-FRICTION BEARING HOUSING

[75] Inventors: Gerhard Ankenbauer, Rotenburg/Fulda; Heinrich Hofmann, Schweinfurt, both of Fed. Rep. of Germany

[73] Assignee: FAG Kugelfischer Georg Schaffer (KGaA), Fed. Rep. of Germany

[21] Appl. No.: 354,449

[22] Filed: May 19, 1989

[30] Foreign Application Priority Data

Mar. 3, 1989 [DE] Fed. Rep. of Germany ....... 3906785

[51] Int. Cl.$^5$ .............................................. F16C 37/00
[52] U.S. Cl. ..................................... 384/476; 384/905
[58] Field of Search ............... 384/476, 493, 537, 900, 384/905

[56] References Cited

U.S. PATENT DOCUMENTS

| | | | |
|---|---|---|---|
| 2,352,206 | 6/1944 | Kendall | 384/476 |
| 3,524,687 | 8/1970 | Hallerback | 384/476 |
| 3,532,402 | 10/1970 | Beery et al. | 384/557 |
| 4,630,945 | 12/1986 | Gerling | 384/900 |
| 4,735,262 | 4/1988 | Lucas | 384/476 X |
| 4,795,931 | 1/1989 | Sturm | 384/476 |

FOREIGN PATENT DOCUMENTS 3333506 4/1985 Fed. Rep. of Germany .

*Primary Examiner*—Thomas R. Hannon
*Attorney, Agent, or Firm*—Ostrolenk, Faber, Gerb & Soffen

[57] ABSTRACT

A sealed anti-friction bearing including an outer ring and inner shaft and two axially spaced sets of races defined in them for rolling element balls, and a respective seal between the outer ring and the shaft axially outward of each of the sets of rolling for elements defining an enclosed space between the seals. A die cast housing cast outside the outer ring. In the axial region of each set of races and their respective adjacent seal, the cast housing including a plurality of axially extending, circumferentially spaced apart, radially projecting ribs generally arranged in a "star shape". The ribs at one set of races open radially outward of the housing and the ribs at the other set of races open radially outward into the remaining solid body of the housing.

9 Claims, 2 Drawing Sheets

DIE CAST ANTI-FRICTION BEARING HOUSING

BACKGROUND OF THE INVENTION

The present invention relates to a cast housing for a sealed bearing and particularly to means formed in the housing that surrounds the bearing for temperature protection.

Federal Republic of Germany Pat. No. 3,333,506 discloses a method of manufacturing a housing with a built-in anti-friction bearing in which a completely assembled, greased and sealed anti-friction bearing is inserted into a die casting mold, the die casting mold is closed, liquid non-ferrous metal which has been heated to about 750° C. is poured into the die casting mold under pressure, the mold is then opened after at most 15 seconds, and the housing with the included anti-friction bearing is ejected from the mold and immediately cooled.

This known method has proven its worth in practice. It is used, for instance, in automobile water pumps. For certain uses, however, special sealing materials, lubricating grease compositions or anti-friction bearings with specially heat treated rings are necessary because the heating occurred upon the pouring in of the liquid die casting material having, for example, a temperature of 750° C., can lead to damage. For instance, the seals can be overheated, the consistency of the lubricating grease can be changed, or the hardness of the bearing race can be reduced. Even with expensive cooling devices located within the die casting molds, damage cannot always be excluded in the case of such special applications.

SUMMARY OF THE INVENTION

It is an object of the present invention to develop an anti-friction bearing housing of the aforementioned type which avoids the above disadvantages and avoids a need for expensive cooling devices in the die casting molds.

This object is achieved with the invention by providing the housing with a plurality of ribs, which extend axially and define a star shape around the housing, and located at the axial regions encompassing both the anti-friction bearing races and the bearing seals. Ribs having a radial thickness of only about twice the thickness of the casting crust which forms have proven satisfactory.

In housings developed according to the invention, the disadvantageous changes experienced with the prior art no longer occur. Due to the development of the ribs, the heat which occurs at the axial regions at the ribs is immediately led away into the mold so that there is no injurious effect on the races, the lubricating grease at the races, or the bearing seals. In addition, it is possible, in this way, to obtain a light weight housing, which still has the required strength properties.

Other objects and features of the present invention will become apparent from the following description of the invention which refers to the accompanying drawings.

DESCRIPTION OF A PREFERRED EMBODIMENT

Figure 1:
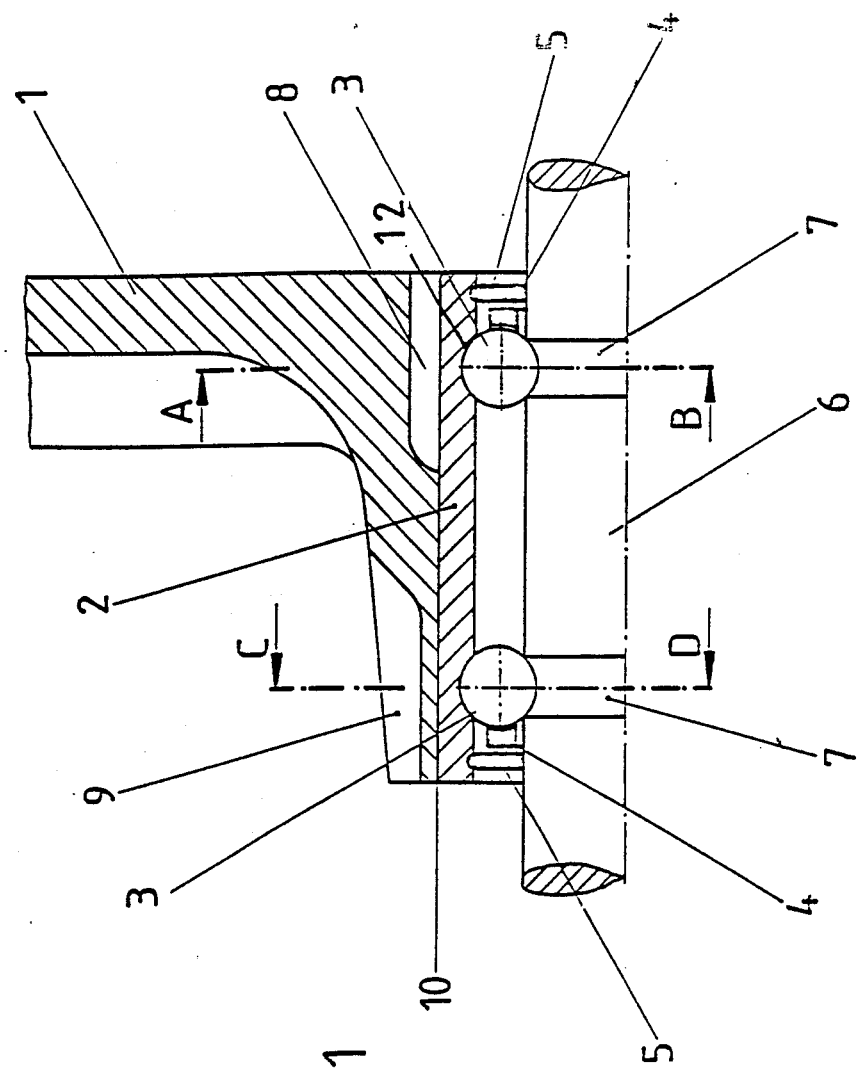
FIG. 1 is a partial longitudinal section through an anti-friction bearing housing in accordance with the invention.

In FIG. 1, the anti-friction bearing housing comprises a die casting, which is formed around the bearing after the bearing is assembled. Radially inward of the casting, the bearing comprises an anti-friction bearing outer ring 2 with axially spaced apart rolling element, e.g. ball element, outer races 12 worked into its radial interior. There are rolling elements 3, here in the form of bearing balls, arrayed around the races in the outer ring 2. Separators or cages 4 are provided at each row of rolling elements.

A central shaft 6 has inner races 7 worked into it at axial locations corresponding to the races 12 in the outer ring 2 for holding the rows of rolling elements in the cooperating races 12 and 7 in the outer ring and the shaft.

Axially outward of the balls 3 and the separators 4 are the respective seals 5 disposed at axially opposite ends of the bearing and sealing between the outer ring 2 and the central shaft 6 and closing the axial space between them, which contains the rolling elements and the races. The seals 5 are axially relatively near the respective rows of rolling elements 3, which is helpful in enabling the below described ribs 8 and 9 to be made shorter in axial length.

Extending axially over the two spaced apart axial regions of the races 7, the anti-friction bearing housing 1 has axial ribs 8 and 9, respectively, arranged around the shaft generally in a radial or radiating pattern, like a star shape.

Figure 2:
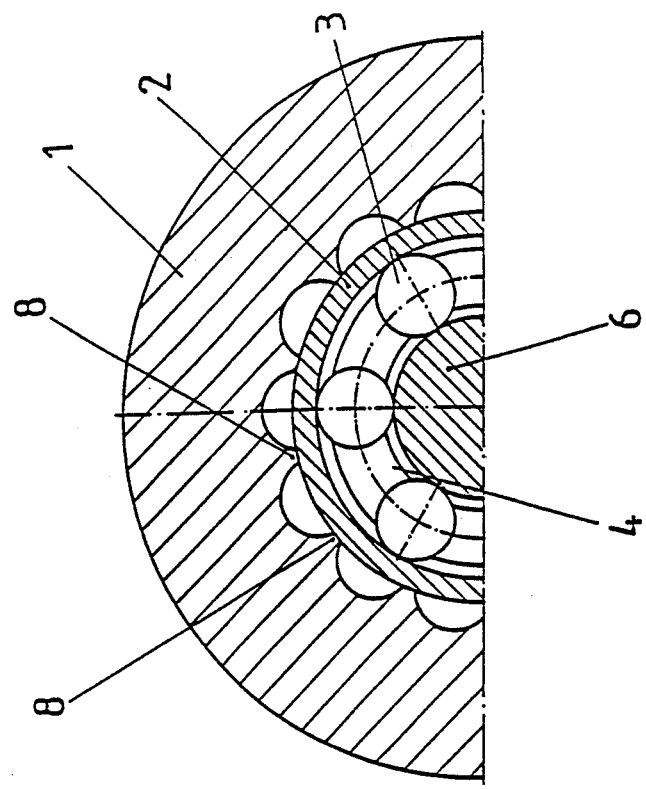
FIG. 2 is a partial cross-section along the line A–B of FIG. 1.
Figure 3:
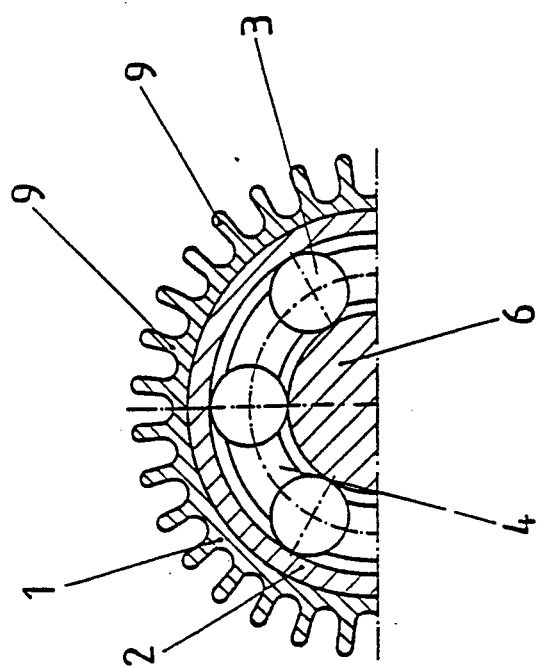
FIG. 3 is a partial cross-section along the line C–D of FIG. 1.

As can be noted from FIGS. 2 and 3, the ribs 8 and 9 are thin in the circumferential direction. The ribs are also thin in the radial direction, where the radial thickness of the ribs amounts to only about twice that of the casting crust which forms during casting of the housing.

The casting includes a housing ring 10 having approximately the thickness of the edge radius of the outer ring 2 and being cast onto the front side of the outer ring 2. In addition to the shrinkage forces, this also provides a form locked fixing in position of the anti-friction bearing in the casting.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. In combination, a cast bearing housing and an anti-friction bearing housed within the housing, the combination comprising:

the bearing comprising: means defining an inner race for a row of bearing rolling elements; an outer ring around the inner race, the outer ring having an outer race defined in it which is placed axially for defining a cooperating set of the inner and outer races for rolling elements; a row of rolling elements received int he set of the inner and outer races for rolling therealong; and seals for the anti-friction bearing between the means defining the inner race and the outer ring and located axially to the sides of the row of rolling elements for defining a sealed space including the races and the row of rolling elements; the housing comprising: a cast housing cast around the outer ring, the cast housing being integrally cast in such a way as to include a plurality of circumferentially spaced apart, radially projecting ribs for rapidly diverting heat away from the bearing as the housing is cast, each of the ribs extending axially, the ribs being located generally in the axial region of the rolling element races and of the seals.

2. The combination of claim 1, wherein the means defining the inner race comprsies means for defining two of the inner races axially spaced apart; the outer ring having two respective outer races, each placed axially for cooperating with a respective inner race for defining respective first and second sets comprised of an inner and an outer race; and a respective row of rolling elements in each of the first set and the second set of inner and outer races;

a first of the seals being defined axially outward of the first set of races and a second of the seals being defined axially outward of the second set of races, such that a sealed space is defined between the first and second seals.

3. The combination of claim 2, further comprising a housing ring cast on one axial side of the outer ring and the housing ring having approximately the same radial thickness as the radius at the corresponding axial edge of the anti-friction bearing.

4. The combination of claim 2, wherein the means defining the inner races comprises a shaft having the inner races defined in the shaft.

5. In combination, as cast bearing housing and an anti-friction bearing housed within the housing, the combination comprising:

the bearing comprising: means defining two axially spaced apart inner races each for a row of bearing rolling elements; and outer ring around the inner races, the outer ring having two respective outer races defined in it, each outer race being placed axially for defining a cooperating first and second set of the inner and outer races for rolling elements; a respective row of rolling elements received in each of the first and second sets of the inner and outer races for rolling therealong;

seals for the anti-friction bearing between the means defining the inner race and the outer ring a first of the seals being defined axially outward of the first set of races and a second of the seals being defined axially outward of the second set of races, such that a sealed space is defined between the first and second seals and including therein the races and the row of rolling elements;

the housing comprising: a cast housing cast around the outer ring; the housing including a plurality of axially extending, circumferentially spaced apart, radially projecting ribs, including a first plurality of the ribs axially over the region of the first plurality of races and the first seal and a second plurality of the ribs axially spaced from the first plurality of ribs and axially over the region of the second set of races and the second seal.

6. The combination of claim 5, wherein the first seal is near enough to the first set of races that the first plurality of ribs extends axially past the first set of races and the first seal; and the second seal is near enough to the second set of races that the second plurality of ribs extends axially past the second set of races and the second seal.

7. The combination of claim 5, wherein the housing has a larger diameter at the first set of races and a smaller diameter at the second set of races;

at the first set of the races, the ribs extend radially outwardly to the outer periphery of the housing;

at the second set of the races, the ribs extend partially toward the outer periphery of the housing and terminate, so that radially further outward of the ribs at the first set of races, the housing thereafter not including the ribs and being more solid.

8. The combination of claim 5, wherein the first and the second pluralities of ribs respectively define generally star shaped radial projections.

9. In combination, a cast bearing housing and an anti-friction bearing housed within the housing, the combination comprising:

the bearing comprising: means defining two axially spaced apart inner races each for a row of bearing rolling elements; an outer ring around the inner races, the outer ring having two respective outer races defined in it, each outer race being placed axially for defining a cooperating first and second set of the inner and outer races for rolling elements; a respective row of rolling elements received in each of the first and second sets of the inner and outer races for rolling therealong;

seals for the anti-friction bearing between the means defining the inner race and the outer ring a first of the seals being defined axially outward of the first set of races and a second of the seals being defined axially outward of the second set of races, such that a sealed space is defined between the first and second seals and including therein the races and the row of rolling elements;

the housing comprising: a cast housing cast around the outer ring; the housing including a plurality of axially extending, circumferentially spaced apart, radially projecting ribs, wherein the cast housing develops a casting crust of a particular radial thickness and the radial thickness of the ribs is equal to about twice the radial thickness of the casting crust which is formed during casting of the housing.

* * * * *